United States Patent
Wesel

(10) Patent No.: US 6,708,029 B2
(45) Date of Patent: Mar. 16, 2004

(54) BROADBAND COMMUNICATION SYSTEM FOR MOBILE USERS IN A SATELLITE-BASED NETWORK

(75) Inventor: Ellen K. Wesel, Manhattan Beach, CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/848,072

(22) Filed: May 2, 2001

(65) Prior Publication Data

US 2003/0207684 A1 Nov. 6, 2003

Related U.S. Application Data

(60) Division of application No. 09/159,817, filed on Sep. 23, 1998, which is a continuation-in-part of application No. 08/867,197, filed on Jun. 2, 1997, now Pat. No. 6,032,041.

(51) Int. Cl.[7] .............................................. H04Q 7/20
(52) U.S. Cl. ...................... 455/428; 455/12.1; 455/429; 370/307; 370/316
(58) Field of Search ............................ 455/12.1, 13.1, 455/13.3, 427, 428, 429, 430; 370/307, 316

(56) References Cited

U.S. PATENT DOCUMENTS

| | | |
|---|---|---|
| 4,358,770 A | 11/1982 | Satoh et al. |
| 4,689,625 A | 8/1987 | Barmat |
| 4,691,882 A | 9/1987 | Young .......................... 455/13.1 |
| 4,792,963 A | 12/1988 | Campanella et al. |
| 4,813,036 A | 3/1989 | Whitehead |
| 4,831,619 A | 5/1989 | Rosen |
| 5,008,952 A * | 4/1991 | Davis et al. ................ 455/12.1 |
| 5,038,150 A | 8/1991 | Bains |
| 5,129,095 A | 7/1992 | Davis et al. ................ 455/12.1 |
| 5,210,753 A | 5/1993 | Natarajan .................... 455/452 |
| 5,233,626 A | 8/1993 | Ames |

(List continued on next page.)

FOREIGN PATENT DOCUMENTS

| | | |
|---|---|---|
| EP | 0 883 252 A2 | 12/1998 |
| EP | 0 887 951 A2 | 12/1998 |
| WO | WO 95/35602 | 12/1995 |

OTHER PUBLICATIONS

"Starlynx™ A Global Mobile Satellite System" (Sep. 26, 1997) FCC Application of Hughes Communications, Inc., before the Federal Communications Commission for Authority to Launch and Operate, 110 pages.

"Expressway™ A Gobal Telecommunications Satellite System" (Jul. 14, 1997 and Sep. 24, 1997) FCC Amended and Restated Application of Hughes Communications, Inc., before the Federal Communications Commission for Authority to Launch and Operate.

*Primary Examiner*—Nay Maung
*Assistant Examiner*—Tilahun Gesesse
(74) *Attorney, Agent, or Firm*—V. D. Duraiswamy; M. W. Sales

(57) ABSTRACT

A satellite-based communications system operating at high data rates includes a plurality of satellites each having uplink and downlink antennas for transmitting and receiving a plurality of signals utilizing a plurality of spot beams to and from a plurality of coverage areas at a predetermined range of frequencies. The system can include, or be combined with, other systems to enable increased capacity over high population areas and ubiquitous coverage over lower population areas. A portable antenna assembly can be coupled to a user's portable or mobile electronic device for coupling the electronic device directly to a satellite. A routing switch provides routing and switching on-board the satellite and routes signals according to their desired destination.

12 Claims, 8 Drawing Sheets

U.S. PATENT DOCUMENTS

| | | | | |
|---|---|---|---|---|
| 5,367,304 | A | 11/1994 | Jan et al. | |
| 5,410,731 | A | 4/1995 | Rouffet et al. | |
| 5,422,647 | A | 6/1995 | Hirshfield et al. | |
| 5,495,258 | A | 2/1996 | Muhlhauser et al. | |
| 5,504,938 | A | 4/1996 | Redden | 455/12.1 |
| 5,548,294 | A | 8/1996 | Sturza | 455/13.1 |
| 5,551,624 | A | 9/1996 | Horstein et al. | |
| 5,559,806 | A | 9/1996 | Kurby et al. | |
| 5,589,834 | A | 12/1996 | Weinberg | |
| 5,602,838 | A | 2/1997 | Kartalopoulos | |
| 5,612,701 | A | 3/1997 | Diekelman | |
| 5,625,624 | A * | 4/1997 | Rosen et al. | 370/307 |
| 5,642,358 | A | 6/1997 | Dent | |
| 5,646,853 | A | 7/1997 | Takahashi et al. | 455/456 |
| 5,713,075 | A | 1/1998 | Threadgill et al. | |
| 5,722,042 | A | 2/1998 | Kimura et al. | |
| 5,722,049 | A | 2/1998 | Hassan et al. | |
| 5,736,959 | A | 4/1998 | Patterson et al. | 455/13.3 |
| 5,781,540 | A | 7/1998 | Malcolm et al. | |
| 5,796,715 | A | 8/1998 | Patterson et al. | |
| 5,815,809 | A | 9/1998 | Ward et al. | |
| 5,822,680 | A | 10/1998 | Stuart et al. | 455/12.1 |
| 5,825,325 | A | 10/1998 | O'Donovan et al. | |
| 5,835,128 | A | 11/1998 | Macdonald et al. | |
| 5,860,058 | A | 1/1999 | Daniel et al. | |
| 5,875,181 | A * | 2/1999 | Hsu et al. | 370/320 |
| 5,892,811 | A * | 4/1999 | Armbruster et al. | 455/12.1 |
| 5,906,337 | A | 5/1999 | Williams et al. | 455/13.1 |
| 5,915,020 | A | 6/1999 | Tilford et al. | 455/575 |
| 5,915,217 | A | 6/1999 | Wiedeman et al. | 455/427 |
| 5,924,014 | A | 7/1999 | Vanden Heuvel et al. | |
| 5,925,092 | A | 7/1999 | Swan et al. | 455/12.1 |
| 6,002,916 | A | 12/1999 | Lynch | |
| 6,009,306 | A | 12/1999 | Hargis | |
| 6,032,041 | A * | 2/2000 | Wainfan et al. | 455/427 |
| 6,047,161 | A | 4/2000 | Sowles et al. | 455/427 |
| 6,061,562 | A | 5/2000 | Martin et al. | |
| 6,125,261 | A | 9/2000 | Anselmo et al. | |
| 6,160,993 | A | 12/2000 | Wilson | 455/12.1 |
| 6,160,994 | A * | 12/2000 | Wiedeman | 455/12.1 |
| 6,249,514 | B1 * | 6/2001 | Campanella | 370/316 |
| 6,272,317 | B1 | 8/2001 | Houston et al. | |
| 6,324,381 | B1 | 11/2001 | Anselmo et al. | |
| 6,336,030 | B2 | 1/2002 | Houston et al. | |
| 6,339,707 | B1 | 1/2002 | Wainfan et al. | |
| 6,341,213 | B1 * | 1/2002 | Wu | 455/12.1 |

\* cited by examiner

BROADBAND COMMUNICATION SYSTEM FOR MOBILE USERS IN A SATELLITE-BASED NETWORK

CROSS-REFERENCE TO RELATED APPLICATIONS

This a division of application Ser. No. 09/159,817 filed Sep. 23, 1998, which was a continuation-in-part of U.S. patent application Ser. No. 08/867,197, entitled "Method and System For Providing Wideband Communications To Mobile Users in a Satellite-based Network" filed on Jun. 2, 1997 now U.S. Pat. No. 6,032,041, the subject matter of such application being incorporated herein by reference.

TECHNICAL FIELD

This invention relates to methods and systems for providing broadband communications to mobile users in a satellite-based communications network.

BACKGROUND OF THE INVENTION

Wired terrestrial systems offer communications at high data rates, but only while the user is sitting behind a computer. As soon as the user goes to a conference room, walks outside an office building, gets into a car, or drives to a park, the connection is lost. Mobility, however, can be supported in one of two ways, namely terrestrial-based wireless networks or satellite-based communications systems.

Terrestrial-based wireless networks provide voice or data communications between a mobile user and a fixed user or to other mobile users, as well as communications for modem-equipped computers and other similar devices such as mobile facsimile machines. Existing wireless networks have not been optimized for a mix of voice, data, and video, however, despite the trend towards multimedia traffic. Several wireless and wired standards, such as asynchronous transfer mode (ATM), are being designed to optimize multimedia traffic. Wireless wide area networks (WANs) typically carry voice, whereas wireless local area networks (LANs) typically carry data. Most wireless WAN traffic operates at under 19.2 kbps. Wireless LANs that support data rates up to 10 Mbps have begun to appear, but they are limited in range to tens of meters.

A typical terrestrial-based wireless network includes a grid of service zones or cells, with each cell having a base station situated near its center. A mobile user located in a particular cell is connected to that cell's base station through low-power radio frequency (RF) transmissions. Each base station is connected by trunk lines to other gateways, which in turn are connected by trunk lines to various other networks. Each of these cells requires costly infrastructure development and covers only a very small area. Placing a wireless base station every 200 m to provide global mobile communications is a very costly and time-consuming endeavor. In addition, the elevation angle between the user and the base station is relatively low for terrestrial-based wireless networks. At high frequencies, obstructions such as trees, buildings, signs, etc. can interfere with reliable communications.

To provide wireless service, satellite-based communications systems have been proposed which would provide world-wide fixed or low-rate (mainly voice) mobile coverage. These proposed systems typically include a—constellation of satellites in one orbit only, such as geostationary earth orbit (GEO) only or non-geosynchronous orbit (NGSO) only. Communications satellites in geosynchronous orbit provide coverage in predetermined areas on the earth from the equator. Coverage is typically excluded from the oceans so that satellite capacity is not wasted on non-populated areas. Communications satellites in geosynchronous orbit, however, provide limited coverage at higher or lower latitudes than the Equator.

Communications satellites in non-geosynchronous orbit, such as medium earth orbit (MEO) or low earth orbit (LEO), travel relative to the Earth's rotation and typically provide high elevation angle coverage at the higher and lower latitudes, and since they are closer to earth, propagation time delays are minimized. Non-geosynchronous communications satellites, however, waste satellite capacity over the oceans during their orbit and currently do not support broadband service to mobile users.

Data rates up to 19.2 kbps, as available from wireless WANs, will not meet future data rate needs of consumers. For example, many computer users are upgrading their wired modems to 56.6 kbps whenever possible. Such users desire a fast response from their modems even while they are away from their desks. In addition, the nature of the information being transferred is changing from short, text-based electronic mail messages to communications with embedded video clips or file attachments. Such media-rich messages consume high bandwidth and communications resources, thus requiring high data rates to allow them to be transmitted and received within a reasonable period of time.

Thus, there exists a need for a wireless communications system that provides broadband communications to mobile users. There also exists a need for an efficient satellite communications system that provides global communications service while maximizing the useful capacity of the satellites, reducing the perceived time delay, and maximizing the minimum elevation angle across latitudes.

SUMMARY OF THE INVENTION

The present invention provides a broadband satellite communications system providing global broadband network services to mobile users. The system includes a plurality of satellites each having uplink and downlink antennas for transmitting and receiving a plurality of signals utilizing a plurality of spot beams to and from a plurality of coverage areas at a predetermined range of frequencies. Each of the plurality of satellites transmits and receives the plurality of signals at one of a first plurality of data rates. The system further includes a plurality of user terminals for transmitting and receiving signals to and from the plurality of communications satellites at the predetermined range of frequencies and at one of the first plurality of data rates. Each of the user terminals have a steerable antenna for tracking relative movement of each of the user terminals with respect to each of the plurality of communications satellites and for tracking movement of each of the plurality of communications satellites so as to maintain communications with the plurality of communications satellites.

In a further aspect of the invention, a portable antenna assembly is provided that connects to an output port of an electronic device such as a computer or a telephone. The portable antenna assembly has a connector coupled to a transmission wire, which in turn is coupled to an antenna element. The antenna element sends and receives signals from a satellite. The antenna may also include a tracking device so that the direction of the antenna may be changed in response relative movement of the antenna location and the location of the satellites.

One advantage of the present invention is that power used by the satellite system may be conserved by using a routing switch that routes signals according to their desired destination. Typically, a packet switch is used to route signals. If the received beam is to be transmitted through to the same beam, the carrier frequency can be shifted and the signal returned through the same beam. These signals thus bypass the packet switch. This saves energy because the packet switch performs other operations on the signal such as demodulation, instruction reading and remodulation, each of which consumes energy. The extra functions are unnecessary if the signal is routed through the same beam.

In yet another aspect of the invention, the spot beams of two satellites may be combined on the ground to provide ubiquitous coverage over the entire land mass. If medium Earth orbit satellite orbits are used, at least two MEO satellites are in view at any one time with the preferred constellation.

DETAILED DESCRIPTION OF THE INVENTION

Figure 1:
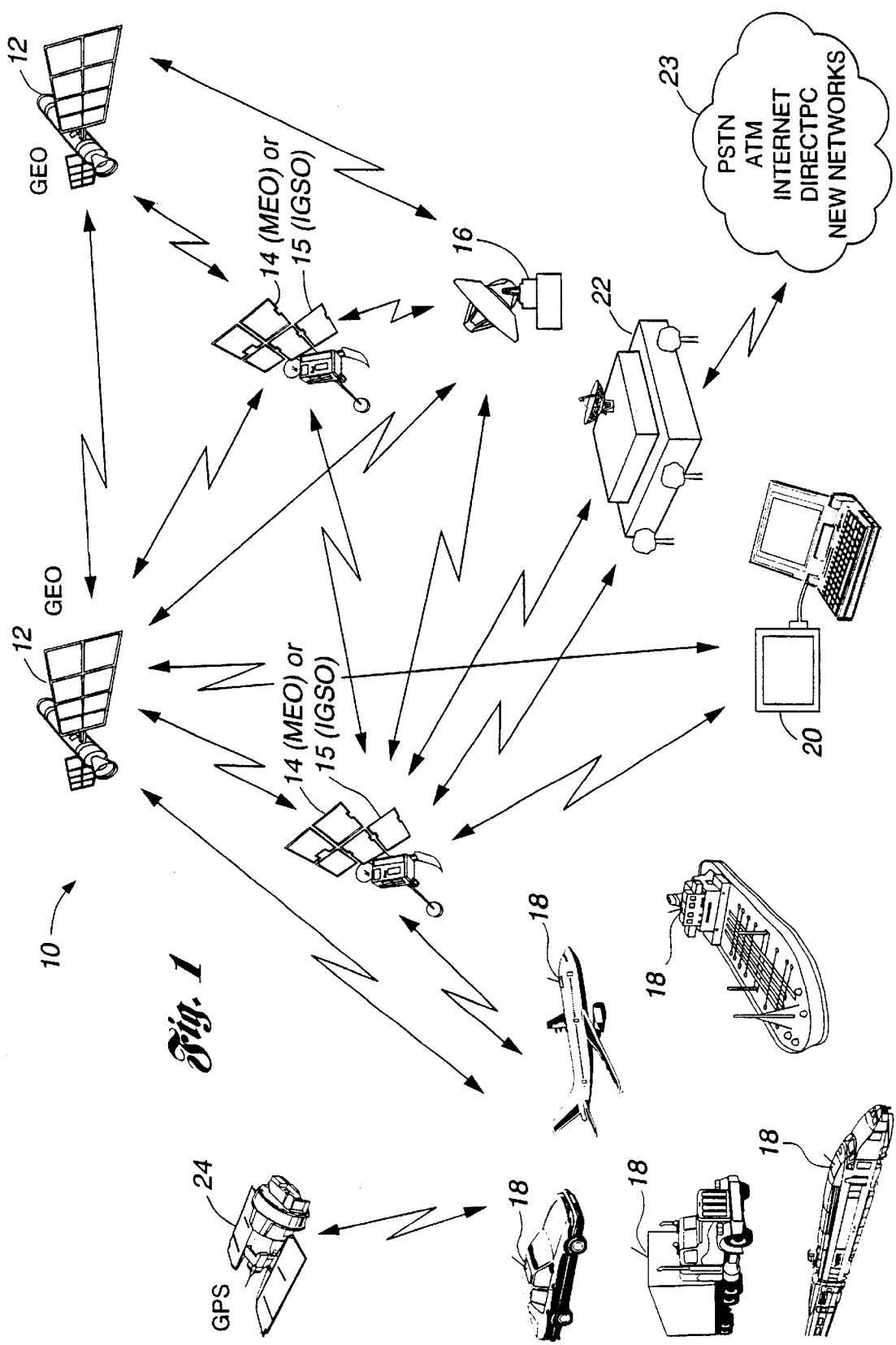
FIG. 1 is a diagrammatic representation illustrating a satellite communications system of the present invention.

Referring first to FIG. 1, a communications system 10 with a typical geometry for practicing the present invention is diagrammatically illustrated. In general, the system 10 includes a plurality of communications satellites both in geostationary earth orbit (GEO) 12 and in non-geostationary earth orbit (NGSO) 14 and 15. A system also includes a ground station 16 for controlling and maintaining operation of satellites 12, 14, and 15, as well as user terminals in the form of either mobile devices 18 or portable devices 20. The system 10 also includes a system access node 22 situated in each region serviced by satellites 12, 14, and 15 which is connected by trunk lines to one of several possible networks 23, e.g., local or long distance public switched telephone networks (PSTN), Asynchronous Transfer Mode (ATM) networks, the Internet, DirecPC (a satellite-based Internet access system), or any other data or voice networks. Still further, the system 10 uses information from at least one GPS satellite 24 to assist in providing positioning information to mobile devices 18.

To provide efficient global coverage, satellites 12, 14, 15 are positioned in two different constellations. The GEO satellites 12 provide quick introduction of regional services, low cost service over selected regions, and greater capacity over high-traffic areas than a NGSO constellation. Preferably, GEO satellites 12 consist of a plurality of satellites in geostationary orbit over high demand regions of the world.

Figure 2:
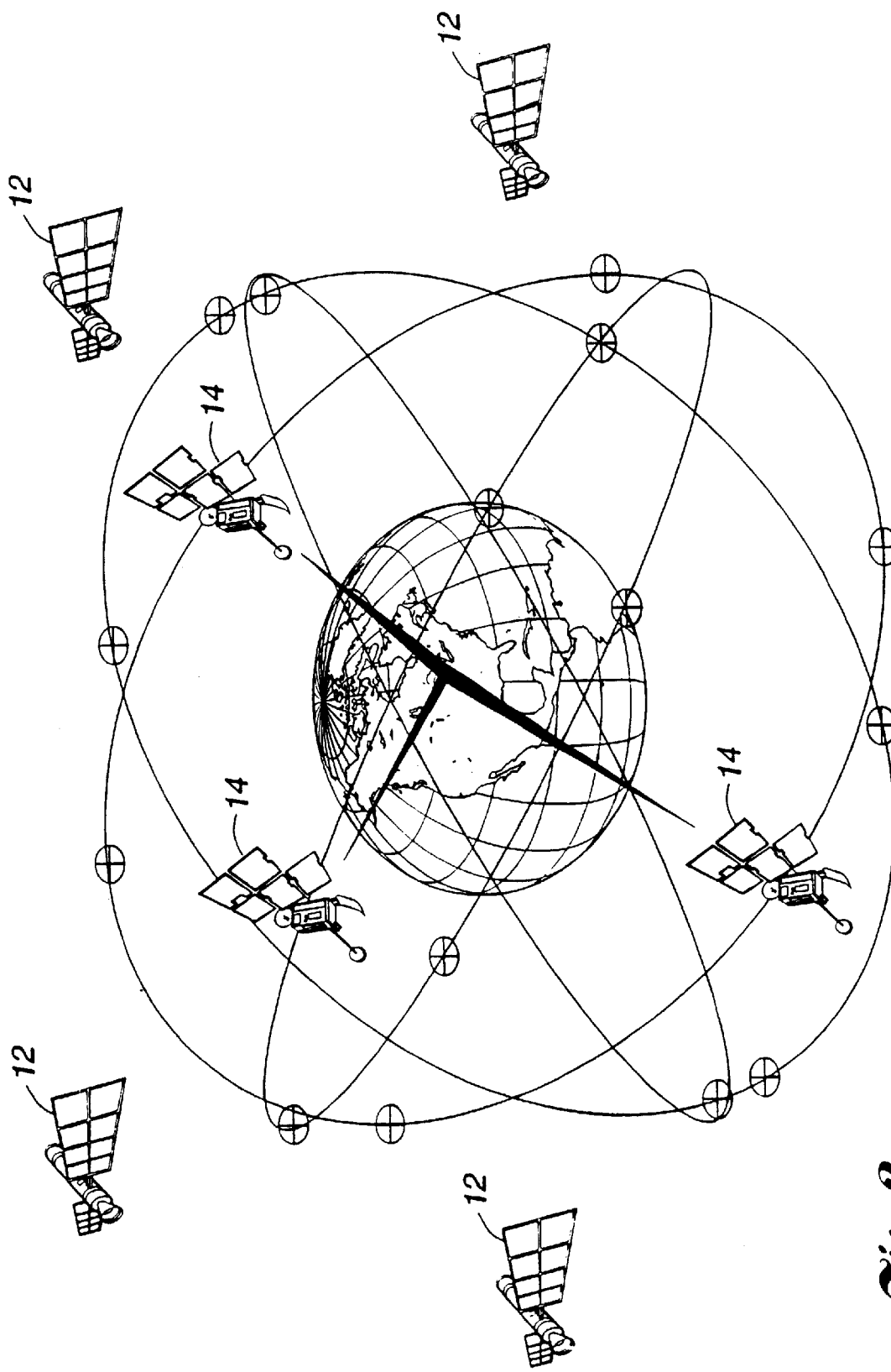
FIG. 2 is a schematic illustration of a GEO/MEO constellation of communications satellites utilized in the present invention.

The NGSO satellites 14, 15 may consist of either medium earth orbit (MEO) satellites 14 or inclined geosynchronous orbit (IGSO) satellites 15. Both MEO and IGSO satellites provide high elevation angle service to higher latitudes, and add satellite diversity to mitigate shadowing and interference effects. MEO satellites 14 reduce latency for highly interactive applications. The round-trip delay to a MEO satellite 14 at an altitude of 10,352.080 km is approximately 80 ms, which serves interactive, real-time traffic well. The MEO constellation also provides a large overall system capacity at a lower complexity than does a low earth orbit (LEO) constellation. Preferably, the MEO constellation is formed by 4 planes, with 5 satellites per plane, as shown in FIG. 2. Also preferably, the MEO constellation is at an equatorial altitude of 10352 km for a 6-hour orbit that repeats its ground track approximately every twenty-four hours. The repeatable ground track feature simplifies the complexity of the satellite payload, since it only has to store four maps identifying its four different orbit patterns. The repeatable ground track also simplifies the sharing of spectrum with other systems and potentially the design of the ground antenna. The satellites in each plane are inclined by 30–60 degrees and have optimized phasing between planes. This constellation allows for over 35 degree elevation to latitudes up to 80 degrees.

The system 10 of the present invention can share the requested frequency spectrum with a limited number of other satellite and terrestrial constellations through satellite diversity. In the MEO implementation, dual satellite diversity exists at latitudes up to 70 degrees, which permits a user to switch to another satellite in view when the signal from its original satellite degrades due to low elevation angle, shadowing, or interference. Over 50% of the time, the MEO user sees three satellites in the latitudes between 20 and 60 degrees. This satellite diversity can also allow increased capacity in a particular geographic location.

Figure 3:
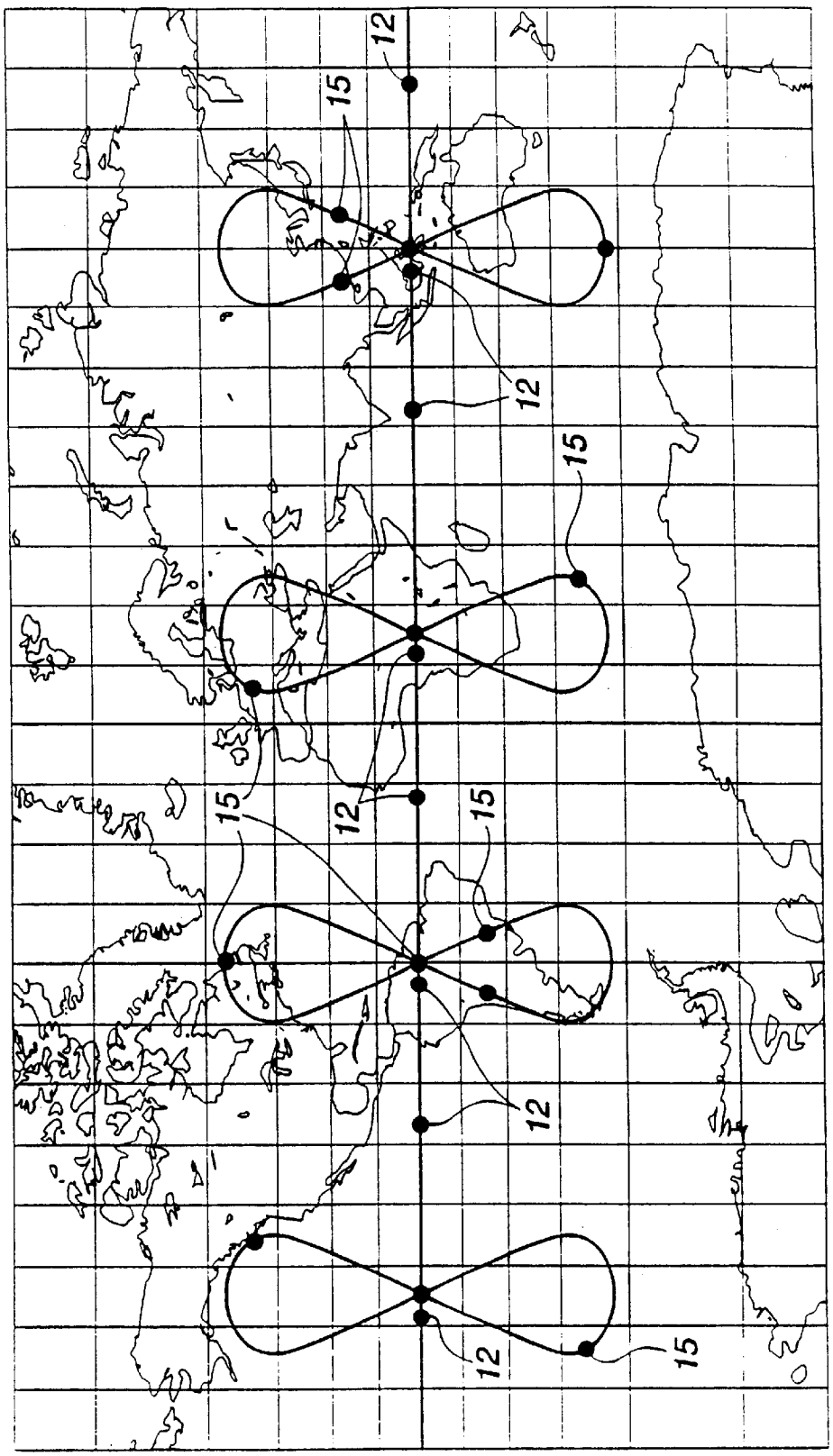
FIG. 3 is a schematic illustration of a GEO/Inclined Geosynchronous Orbit (IGSO) ground track of communications satellites alternatively utilized in the present invention.

IGSO satellites 15 may alternatively be utilized for many of the same reasons an MEO constellation is used, i.e., to provide high elevation angle coverage for higher latitudes than available through GEO satellites, and to minimize the interference with other communication systems operating at the same frequency. Preferably, the IGSO constellation consists of 4 planes of three satellites per plane, phased by 90 degrees between planes at 55 degrees inclination. A ground track of the IGSO satellites 14 is shown in FIG. 3. As shown in FIG. 3, IGSO satellites 15 share an orbit slot with GEO satellites 12. That is, the constellation of IGSO satellites 15 allows the IGSO satellite 15 to pass over an arc of the GEO satellite 12. Scarce frequency spectrum can be shared between GEO satellites 12 and IGSO satellites 15. This configuration also allows an additional satellite, not part of the system 10 of the present invention, to be placed in the same orbit slot and provide service while operating at the same frequency, thereby sharing frequency spectrum.

Figure 4:
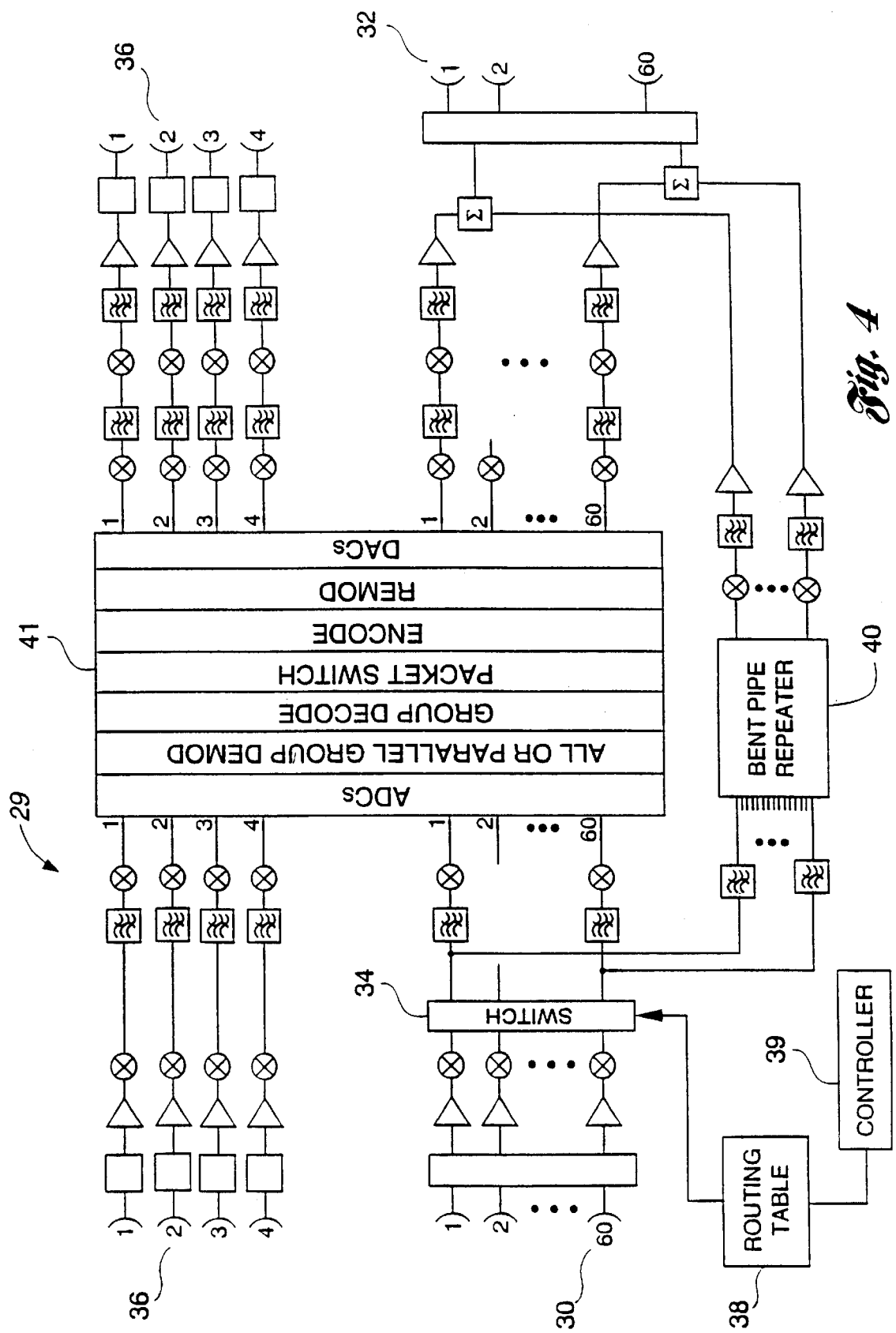
FIG. 4 is a schematic block diagram illustrating a communications subsystem within the satellites of the present invention.

Each of the satellites 12, 14, 15 are preferably high power satellites that use a multi-panel solar array system, along with outboard radiator panels attached to the main body to dissipate heat generated from high powered Traveling Wave Tubes (TWTs). A schematic block diagram illustrating a communications payload 29 within satellites 12, 14, 15 is shown in FIG. 4. Each satellite 12, 14, 15 includes a high frequency uplink antenna array 30, a high frequency downlink antenna array 32, a hybrid switch 34, and intersatellite links 36. This architecture allows a signal received by one satellite to be transponded directly back to the same beam, switched to another beam, or relayed by intersatellite links through other satellites, forming a global network for the transport of real-time voice and data signals.

Payload 29 operates in a predetermined frequency range, preferably in the 50/40 GHz region (i.e., V-band), or any other similar high frequency range, to provide high capacity service to small user terminals. The higher frequencies are associated with the longer bandwidth needed to support users at many high rates. For example, data rates up to 2.048 Mbps (equivalent to E1 rate) for portable devices 20 and up to 10 Mbps (equivalent to Ethernet rates) for mobile devices 18 can be supported. Users operating at data rates below the E1 or Ethernet levels can be accommodated through a variety of medium access control protocols such as TDMA.

Uplink antenna array 30 and downlink antenna array 32 at the satellite receive and transmit spot beams carrying signals at a predetermined range of frequencies. Narrow spot beams allow a greater power to be effectively received and transmitted in the area they cover and enable very small antennas for mobile devices 18. A single satellite antenna can produce many spot beams. Not only do satellites with multiple narrow beam antennas provide a higher radiated power to a covered area, but the same frequency can also be reused several times for different portions of the earth, resulting in more efficient use of scarce frequency allocations.

Figure 5:
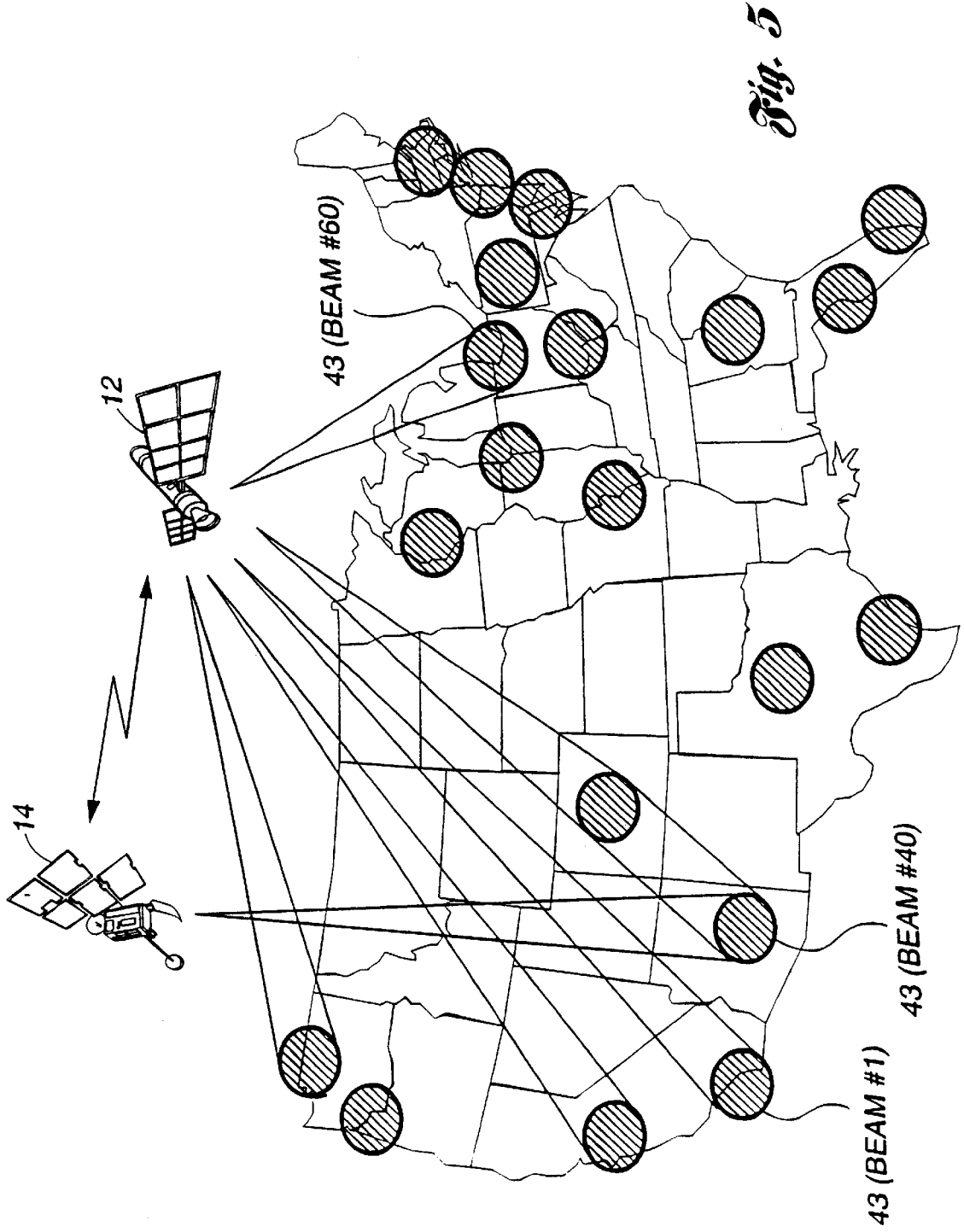
FIG. 5 is a schematic illustration of satellite coverage using spot beams.

In the present invention, a surface, or area, such as the Continental United States (CONUS), which receives communications services of the present invention is divided into a plurality of coverage areas 43, as shown in FIG. 5. Uplink and downlink antennas 30, 32, respectively, can support a predetermined number of coverage areas, e.g., 200. However, a subset of the plurality of coverage areas 43 is chosen to be used by uplink and downlink antenna arrays 30, 32, respectively, to support communications services in selected metropolitan areas having heavy traffic. As an example, the Los Angeles area can be served by one high capacity beam, (e.g., Beam 1) while other areas, such as Phoenix and Detroit, are served by other high capacity beams (e.g., Beams 40 and 60). This configuration is controlled by beam selection commands sent by ground station 16. Thus, the spot beams formed by GEO satellites 12 are semi-fixed in position, until reconfigured at a later date. It is possible to have the beams "hop" across various regions in a non-uniform manner, so as to dwell the majority of the time over high-demand areas, but also to serve low-demand areas at predetermined times. Thus, available satellite resources, such as weight and power, are optimized. The MEO spot beams are reconfigured dynamically as the MEO satellite 14 travels.

GEO satellites 12 preferably transmit the spot beams utilizing a multibeam antenna array. Many small feed horns are positioned so that their signals are reflected in narrow beams by a dish portion of the antenna. For the MEO satellites 14 and the IGSO satellites 15, the spot beams are formed by steerable phased array antennas.

When traffic is received from a source beam that is destined for the same beam, hybrid switch 34 allows the traffic to be sent through bent-pipe repeater 40 down to the same beam with only a carrier frequency translation. Alternatively, the traffic through bent-pipe repeater 40 can be routed to one or more hub beams. The system access node 22 in the receiving beam receives the information and routes the traffic to its intended destination either through the wired network 23 or back through the satellite. This configuration allows for full flexibility in routing traffic to its ultimate destination, while reducing the satellite switch size, power draw, and mass.

When traffic is received from a source beam that is destined for a different beam, hybrid switch 34 routes the traffic through full digital packet switch 41. Full digital packet switch 41 demodulates incoming packets, reads the headers and decodes the packets, routes the packets to their destination beams, encodes the packets and remodulates the packets. Alternatively, an error switch can be flown on the satellite, with appropriate reading of the header determining the destination beam. This feature allows direct connections between user terminals 18, 20, as well as bypass of the terrestrial network for other connections. A packet arrangement allows a user to be charged for services based on bit traffic rather than a more expensive interconnect time.

Thus, hybrid switch 34 allows routing from one beam to another and bypasses full digital packet switch 38 for bent-pipe connections to predetermined beams. The system 10 allows controller 39 at the satellite to control real-time traffic on satellites 12, 14, 15 rather than on the ground, so as to reduce transmission delay, congestion and complexity and cost of the total system.

The logic determines whether a signal should be sent through the bent-pipe repeater 40 or through the digital packet switch 41 can be implemented in many ways. One method would be to use special frequency bands for the transmission of bent-pipe traffic. In this method, the user terminal 18,20 transmits the signal at a specific frequency depending on whether or not signal is to be bent-pipe routed back to the same beam as the source location of the signal, or packet-switched to a different beam. The satellite, detecting traffic on these frequencies, knows to route the traffic through the bent-pipe repeater or to the packet switch via hard-wired connections. Another method would be to use specific time slots for bent-pipe traffic and other time slots for packet-switched traffic. In this method, the table of which time slots are used for bent pipe traffic and which time slots are used for packet-switched traffic would be stored in a routing table 38. This routing table 38 can be updated by commands sent by ground station 16 via a controller 39 onboard the satellite. Thus, the signals can be differentiated at the satellite without the need for demodulation, reducing the satellite switch size, power consumption, and mass.

The user terminal 18,20 can transmit both types of signals; those meant to be bent-piped back to the same beam or packet-switched to a different beam. There are various methods for the user terminal 18,20 to select which type of signal to transmit. One method is to have the terminal automatically select the type of signal based on the application; local phone calls, for instance, might all be sent as bent-pipe signals, whereas web browsing might automatically use the packet-switched signal to more quickly access distant web servers. Another method is to have the user select whether his connection is to be back to the same beam or to a different beam.

The data rates vary depending upon the user terminal 18, 20 and whether or not rain is present. When there is no rain present, mobile devices 18 support maximum bit rates of 10 Mbps, while portable devices 20 support maximum bit rates of 2 Mbps. The minimum data rate supported is 4 kbps for compressed voice traffic. In heavy rain periods, user terminals 18, 20 fall back to a lower data rate to mitigate the effects of additional signal attenuation caused by rain. In this lower data rate mode, mobile devices 18 support bit rates of up to 2.5 Mbps, while portable devices 20 support bit rates of 500 kbps. These data rates can carry a range of services, including voice, high quality video, image downloads, and internet/intranet browsing. The control of the data rate can be accomplished by one of several possible methods. Preferably, the data rate is controlled onboard the satellite by having the controller 39 detect degraded performance in a given service area 43 and automatically adjust the information data rate. The data rate is adjusted by including more error correction bits in the signal which increases the reliability of the message while reducing the effective data rate.

Because weather conditions are local, a portion of the beam (Beam #1) serving the Los Angeles area might be operating in the clear mode, while another portion of the same beam may be experiencing rain. In order to minimize the impact of lower data rates to the area affected by the rain, the area where lower data rates must be used is localized at any point in time. A user learns of the current data rate through the connection setup procedure. If the weather changes during the connection, the satellite controller 39 sends a broadcast information packet informing the affected users of the data rate change. User terminals 18, 20 then automatically switch to the lower data rate.

Intersatellite links 36 are included so that traffic from one satellite covering a particular region or selected metropolitan areas can be linked to a second satellite covering the same or other areas and regions. Intersatellite links 36 also permit seamless handoffs of traffic as one NGSO satellite leaves a region and another enters. Intersatellite link 36 may be an optical (or laser) link operating in the 1.55 micron region via two 9 inch laser-telescope assemblies 71,73. Alternatively, intersatellite link 36 may be a radio frequency (RF) link operating in the 60 GHz region.

As discussed above, each of the satellites 12, 14, and 15 are also in communication with ground station 16. Ground station 16 has two functions. A satellite control function manages the health and status of all the satellites 12, 14, 15 and maintains their orbits. A network operations control function provides resource management, fault management, accounting and billing information. Ground station 16 is preferably placed in low-rain regions of the world so as to provide line-of-sight communications with each of the satellites 12, 14, and 15.

The system 10 further includes mobile devices 18 or portable devices 20. Mobile devices 18 provide safety, external navigation, productivity and entertainment services to mobile vehicles, such as cars, trucks, airplanes, trains or boats. Utilizing GPS 24, tracking information and location-dependent services can be provided to mobile device 18. Mobile device 18 is preferably a conformal tracking phased array antenna mounted to the roof of the mobile vehicle so as to maintain communication with each of satellites 12, 14, and 15 even though mobile device 18 is in motion. Mobile device 18 is preferably no larger than 50 cm×50 cm.

Portable devices 20 allow a user to stay connected to a variety of services anywhere in the world. Portable device 20 is a notebook-sized device, preferably no larger than 20 cm×30 cm in size, that is configured to be connected to a variety of electronic devices which would otherwise use a wired modem connection. As with mobile devices 18, portable devices 20 includes a tracking antenna, such as an electronic phased-array antenna, to communicate with any of the satellites 12, 14, and 15.

System access node 22 of the present invention provides end users a transparent connection to terrestrial networks 23. System access node 22 includes an antenna, such as a fixed parabolic antenna or a mechanically steered or phased array antenna, to communicate with each of the satellites 12, 14, and 15. System access node 22 demodulates the received signals, and routes the traffic through the terrestrial network 23 to their ultimate destinations. By providing a global communications mesh, and by interfacing to existing terrestrial networks, the system 10 of the present invention will be an integral and defining part of the Global Information Infrastructure (GII), and part of the U.S. National Information Infrastructure (NII).

The satellite communications system of the present invention serves the increasing number of people on-the-go who desire voice and high data-rate, interactive data connections from anywhere. Using either the portable or mobile device, users are able to stay connected to a variety of networks such as the internet, wide and local area networks, home and office computers, ATM networks, and the terrestrial phone system.

In one possible implementation, the capacity to a mobile user 18 is 9.75 Gbps per GEO satellite 12 and 5.12 Gbps per MEO satellite 14. The MEO constellation can support up to 102 Gbps worldwide. With a total of 28 satellites in both MEO 14 and GEO 12, the total mobile system capacity jumps up to 190 Gbps worldwide. The network is capable of supporting a wide variety of data rates, ranging from 4 kbps for compressed voice traffic up to 10 Mbps for Ethernet speeds. The number of users at each data rate will vary, and the corresponding total number of users that the network can support will vary accordingly.

The system 10 of the present invention can include, or be combined with, other systems to enable increased capacity over high-population areas and ubiquitous coverage over lower-population areas and to provide a backup connection at a lower frequency to maintain the communications link in rain conditions. This can be accomplished by having the other systems transmit a wide area beam surrounding the narrow spot beams to provide service to the remote areas not covered by the spot beams. The data rates in these areas, however, would typically be lower than the data rates of the present invention.

Figure 6:
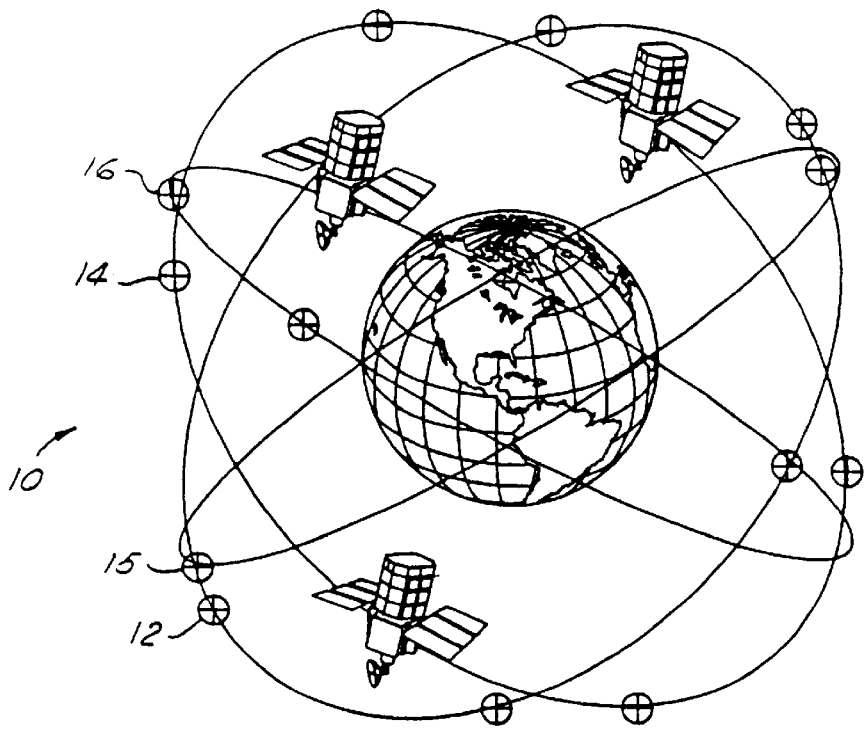
FIG. 6 is a schematic illustration of an alternative constellation of communication satellites utilized in the present invention.

Referring now to FIG. 6, system 10 as described above contains NGSO satellites such as MEO satellites 14 or IGSO satellites 15 as well as GEO satellites 12. System 10, however, may also be extended to include low earth orbit (LEO) satellites 16. At present, the LEO orbit 16 is not a cost effective satellite system. LEO satellite systems, due to their close proximity to the earth, typically comprise several more satellites in their orbital path than with MEO satellite systems. By providing several more LEO satellites or several more MEO satellites in a communications system, higher elevation angles may be achieved. The higher elevation angles reduce shadowing effects. If demand increases as projected, MEO satellites 14, IGSO satellites 15, and LEO satellites 16, along with GEO satellites 12, may cooperate to provide direct coverage and sufficient capacity for predetermined areas on the earth's surface. One advantage of the system is that as the various satellites travel with respect to the earth's surface, the spot beam pattern may be altered to suit the particular land mass and usage requirements. These changes will be further described below.

Figure 7:
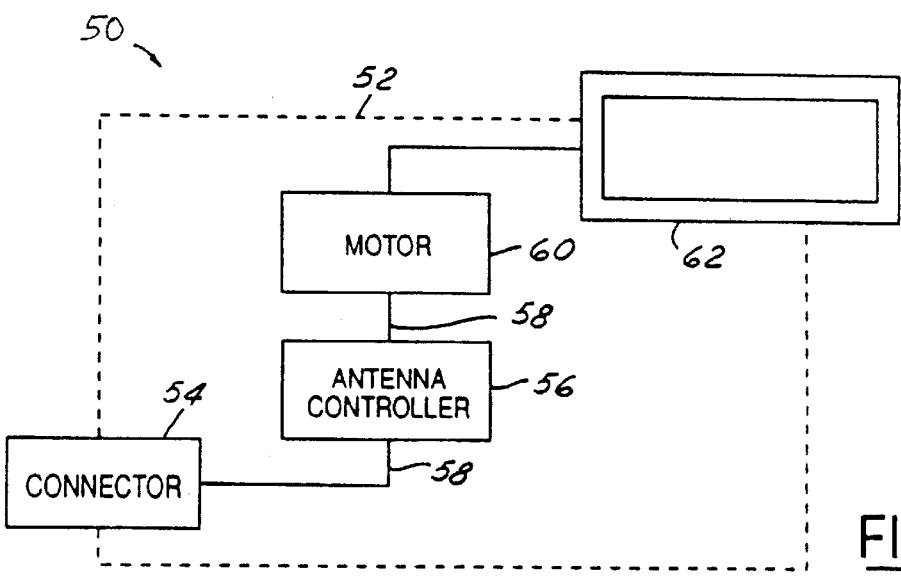
FIG. 7 is a schematic illustration of a portable flat panel antenna that may be used to link an electronic device to a satellite.

Referring now to FIG. 7, an antenna assembly 50 is shown, which is suitable for coupling to an electronic device. Antenna assembly 50 has a housing 52 which is sized to permit easy transportation of the antenna assembly. In a preferred embodiment, antenna assembly 50 is preferably less than 20 cm by 30 cm. Antenna assembly 50 has a connector 54 sized to be received within an output port of an electronic device. Connector 54 may, for example, be the size of a phone jack and coupled to a modem port of a computer. Connector 54 is also coupled to an antenna controller 56 by a transmission line 58. Transmission line 58 also extends between antenna controller 56 and a motor 60. Motor 60 is coupled to an antenna 62 and used to position the antenna 62 to receive and send satellite communications.

Antenna controller 56 is preferably microprocessor based and receives signals from antenna 62 to allow motor 60 to properly position antenna 62. Commonly, satellites generate beacons that may be used to properly position the antenna 62.

In order to position the antenna 62, it should be aimed skyward. Beacon signals are received through the antenna 62 and the controller 56 then calculates the desired direction for the antenna. The desired direction is preferably toward one of the satellites in view.

Antenna 62 is preferably a flat panel antenna and may be, for example, a phased array antenna or is mechanically steered and rotated by motor 60, to its desired position, where the shape of the beam may be electronically generated through antenna controller 56. Thus, the beam is a mechanically steered electronically shaped beam.

Figure 8:
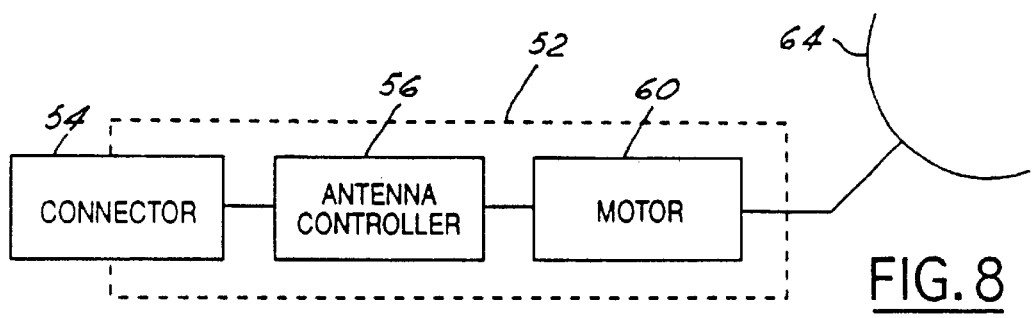
FIG. 8 is an alternative embodiment of a portable antenna assembly having a parabolic antenna.

Referring now to FIG. 8, the same reference numerals are used to identify the same components as in FIG. 7. The difference between FIG. 8 and FIG. 7 is that the antenna of FIG. 7 has been replaced by a parabolic dish antenna 64. Parabolic dish antenna 64 is preferably positioned in a similar manner to that of antenna 62, above. Also, housing 52 is preferably sized to facilitate portability. Parabolic dish antenna 64 may be foldable or disassemblable to facilitate compact storage when not in use.

Figure 9:
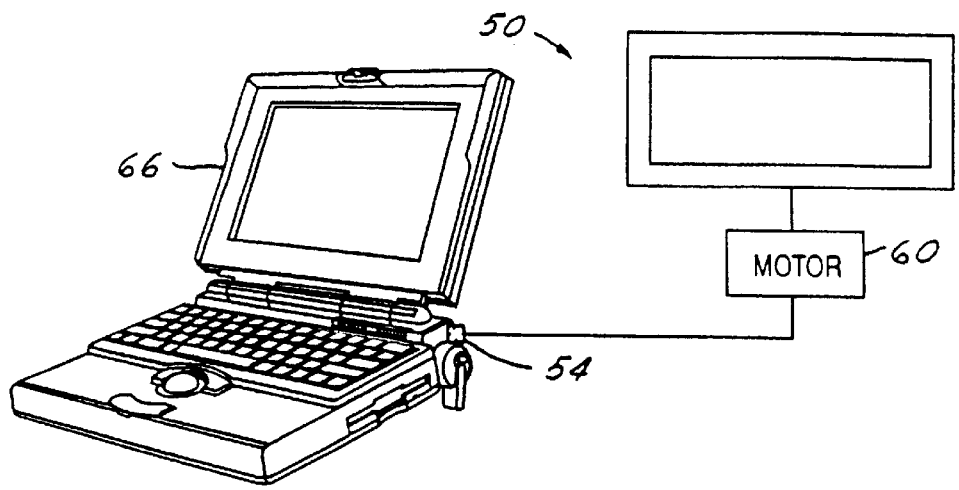
FIG. 9 is a plan view of a laptop computer coupled to an antenna.

Referring now to FIG. 9, one example of a use for the portable antenna is illustrated. Antenna assembly 50 may be coupled to a laptop computer 66 through connector 54. In this embodiment, antenna controller 56 of FIGS. 7 and 8 may be incorporated directly into the laptop computer 66. Thus, motor 60 may be positioned through the microprocessor within the computer.

Figure 10:
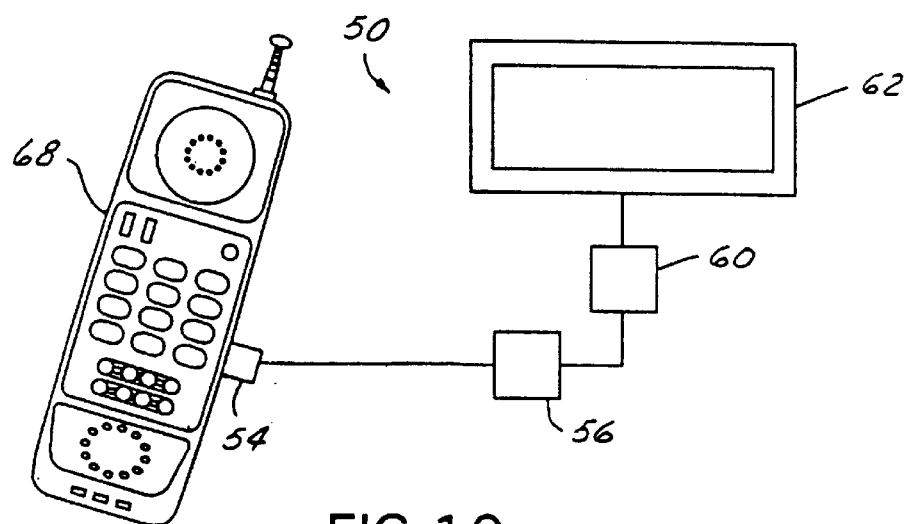
FIG. 10 is a plan view of a cellular phone coupled to an antenna.

Referring now to FIG. 10, another application for use of an antenna assembly 50 is illustrated. In this system, the antenna assembly 50 is coupled to a cellular phone 68. In addition to, or exclusive from, its capability to communicate with terrestrial-based cell sites, cellular phone 68 may use antenna 62 to communicate directly with a satellite. Cellular phone 68 may also incorporate the antenna controller function therein. However, due to the ever decreasing size of cellular phones, it is more likely that a commercial embodiment would position the antenna controller external to the cellular phone 68.

Figure 11:
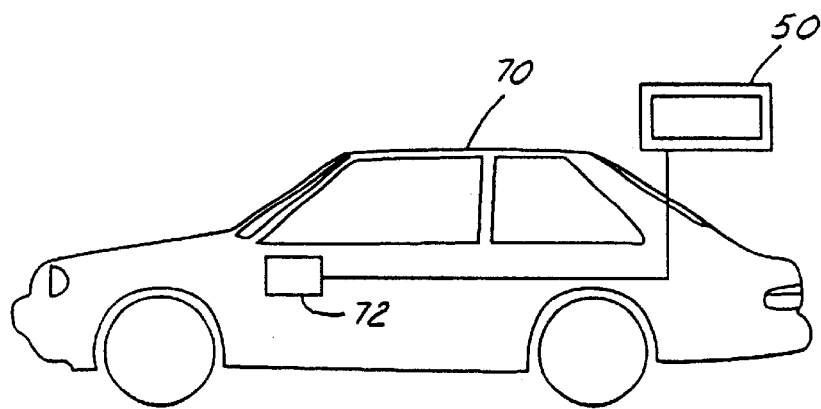
FIG. 11 is a cutaway plan view of an automotive vehicle having a computer coupled to antenna.

Referring now to FIG. 11, the antenna assembly 50 may be coupled to the exterior or interior of a vehicle such as a car, airplane, train, or ship. As illustrated, vehicle 70 is a car. Antenna assembly 50 is coupled to an electronic device 72 located within the vehicle 70. Electronic device 72 may be, for example, a cellular phone or computer that is directly wired into the vehicle. Electronic device 72 may also be a navigation device that uses the satellite for location of the vehicle. In an automotive vehicle, antenna controller 56 may be incorporated in one of several microprocessors onboard the vehicle.

Figure 12:
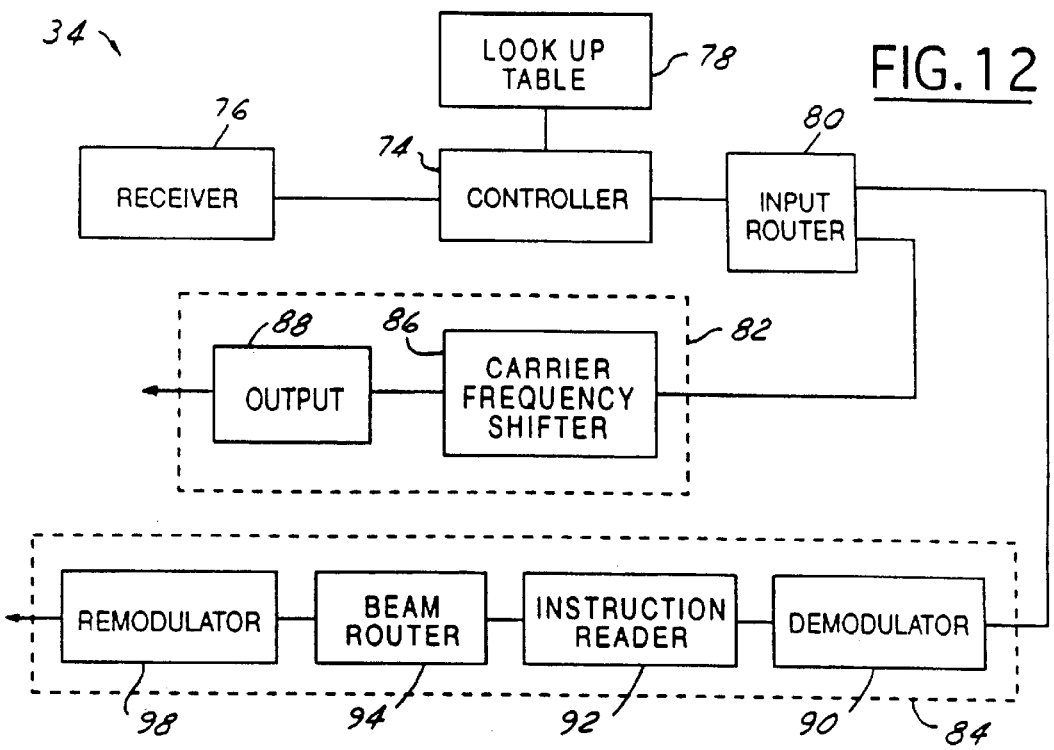
FIG. 12 is a schematic view of a switch according to the present invention.

Referring now to FIG. 12, a hybrid switch 34 such as that described above is illustrated in further detail. Hybrid switch 34 allows power to be conserved, as will be described below. A controller 74 controls the various functions of hybrid switch 34. A receiver 76 is coupled to controller 74 and receives a transmission from a satellite.

Controller 74 is coupled to a lookup table 78 and input router 80. Although illustrated as two separate components, controller 74 and input router 80 may be combined. Likewise, if controller has sufficient memory, the lookup table 78 may also be enclosed within the controller 74. Controller 74 analyzes the signal to determine whether the signal is destined for the same beam or whether the signal is destined for another beam. This may be accomplished without demodulating the signal initially. Lookup table 78 may be used to find the various types of signals and determine their destinations based merely on the unmodulated signal itself. Input router 80 controls the destination of the received signal and is coupled to a bent pipe repeater 82 and a digital packet switch 84.

Bent pipe repeater 82 has a carrier frequency shifter 86 and an output 88. If the received signal is to be transmitted back along the same beam from which it was received, input router 80 routes the received signal to bent pipe repeater 82. Repeater 82, through carrier frequency shifter 86, merely shifts the carrier frequency of the received signal so that the received signal may be retransmitted down the same beam.

If the received signal is to be transmitted to several signals or through a beam different from which it was received, input router 80 routes the input signal to digital packet switch 84. Digital packet switch 84 has a demodulator 90, an instruction reader 92, a beam router 94, and a remodulator 98. The received signal is demodulated in demodulator 90. This allows the instruction reader 92 to read any header information contained on the received signal as to the destination of the received signal. Instruction reader 92 provides beam router 94 with the information required so that beam router 94 may properly route the received signal to the proper beam to be transmitted back to the earth. Prior to transmission, however, remodulator 98 modulates the previously demodulated signal. Remodulator 98 may remodulate the demodulated signal with various carrier frequencies depending on the beam through which the signal is transmitted.

Figure 13:
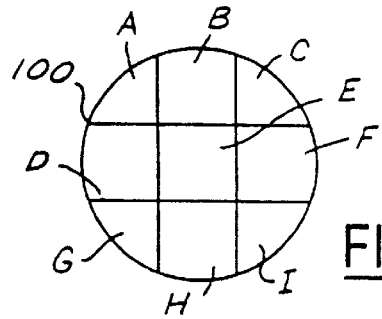
FIG. 13 is a plan view of a spot beam formed according to the present invention.

Referring now to FIG. 13, a spot beam 100 is divided into nine segments labeled A through I. A satellite may be capable of independently controlling the data rates of the various areas of spot beam 100. For example, if area C is in rain, a lower data rate may be applied to that area. The other areas of spot beam 100, that is A, B, and D through I, if no rain is present, may all be operated in a non-affected (clear) data rate. One possible implementation provides transmitting at different power levels on each of frequency carrier segments A through J.

Figure 14:
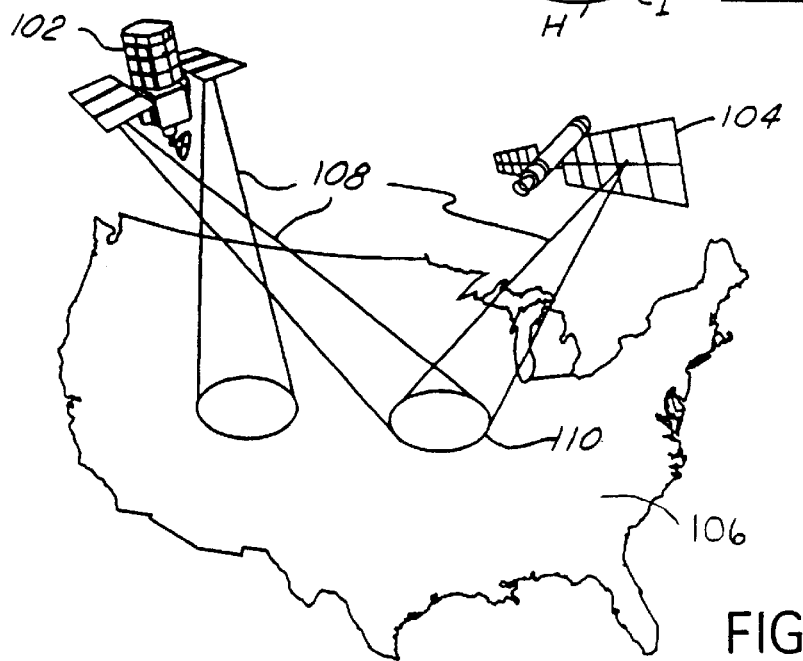
FIG. 14 is a schematic representation of a pair of satellites positioned over a land mass and directing communication signals to the land mass according to the present invention.

Referring now to FIG. 14, a pair of satellites 102 and 104 are positioned over a land mass 106, and a plurality of spot beams 108 are illustrated. Spot beams 108 from the two satellites 102 and 104 may combine to ubiquitously cover the land mass 106. Satellites 102 and 104 may have a sufficient quantity of spot beams 108 to allow overlapping coverage in various areas of land mass 106. This is particularly useful if one area of the country has a particularly high traffic volume through one of satellites 102 or 104. In certain situations, spot beams 108 may directly overlap at a common area 110. Although one common area is illustrated, several common areas 110 may be applied over highly populated regions of the country such as Los Angeles or New York.

While the best modes for carrying out the invention have been described in detail, those familiar with the art to which this invention relates will recognize various alternative designs and embodiments for practicing the invention as defined by the following claims.

What is claimed is:

1. A switch for use in a satellite system comprising:
    a receiver for receiving a signal from a beam of a signal source;
    a beam router coupled to the receiver;
    a controller coupled to said receiver, said controller analyzing the beam and directing the signal to said beam router;
    a bent pipe repeater coupled to said router, said bent pipe repeater directing the signal back to the beam; and
    a digital packet switch coupled to said router to direct the signal to a second beam;
    said controller controlling the operation of the beam router to route the signal to either the bent pipe repeater or the digital packet switch in response to analyzing the signal.

2. A switch as recited in claim 1 wherein said signal source is a terrestrial system.

3. A switch as recited in claim 1 wherein said signal source is another satellite.

4. A switch as recited in claim 1 wherein said digital packet switch comprises a demodulator.

5. A switch as recited in claim 1 wherein said digital packet switch comprises an instruction reader for reading an instruction.

6. A switch as recited in claim 1 further comprising a look-up table, said look-up table providing a routing instruction to said controller.

7. A switch as recited in claim 1 wherein said digital packet switch comprises a beam router for routing the beam.

8. A switch as recited in claim 1 wherein said digital packet switch comprises a remodulator.

9. A switch as recited in claim 1 wherein said bent pipe comprises a carrier frequency shifter.

10. A method of operating a switch for use in a satellite system comprising:
    receiving a signal from a first beam of a signal source;
    directing the signal to a beam router; and
    if the signal is destined for the first beam, then directing the signal from the beam router to the first beam through a bent-pipe repeater; and
    if the signal is destined for a second beam, then directing the signal from the beam router to the second beam through a digital packet switch.

11. A method as recited in claim 10 wherein directing the signal back to the first beam through a bent-pipe repeater comprises translating a carrier frequency.

12. A method as recited in claim 10 wherein directing the signal to the second beam comprises demodulating incoming packets, reading headers of the packets, decoding the packets, routing the packets to the second beam, encoding the packets and remodulating the packets.

* * * * *